United States Patent [19]

Vicard

[11] 4,170,555

[45] Oct. 9, 1979

[54] METHODS AND APPARATUS FOR CENTRIFUGAL TREATMENT OF FLUIDS CONTAINING IMPURITIES IN SUSPENSION

[75] Inventor: Jean-Francois Vicard, Lyons, France

[73] Assignee: Societe Lab, Villeurbanne, France

[21] Appl. No.: 960,802

[22] Filed: Nov. 14, 1978

[30] Foreign Application Priority Data

Nov. 22, 1977 [FR] France ............................... 77 35680

[51] Int. Cl.² ........................................... B01D 45/16
[52] U.S. Cl. ...................................... 210/74; 55/127; 55/340; 55/449; 55/459 A; 210/84; 210/197; 210/198 R; 210/243; 210/512 R
[58] Field of Search ................... 210/74, 84, 194, 196, 210/147, 234, 512 R, 512 M, 198 R; 55/127, 340, 398, 449, 459 R, 459 A; 209/144, 211

[56] References Cited

U.S. PATENT DOCUMENTS

| | | | |
|---|---|---|---|
| 2,010,128 | 8/1935 | Arnold | 55/459 A X |
| 3,371,033 | 2/1968 | Simmons et al. | 210/197 X |
| 3,507,397 | 4/1970 | Robinson | 210/512 R |
| 4,017,390 | 4/1977 | Vicard | 210/512 M X |
| 4,048,067 | 9/1977 | Cheng | 210/84 X |
| 4,116,790 | 9/1978 | Prestridge | 210/84 X |

Primary Examiner—William A. Cuchlinski, Jr.
Attorney, Agent, or Firm—Dowell & Dowell

[57] ABSTRACT

In a process for the centrifugal treatment of liquid of liquid or gaseous fluids containing impurities in suspension, of the type in which the fluid to be treated is injected tangentially in a first end of an apparatus of circular transverse section in which this fluid forms a first, substantially cylindrical rotating layer, while at the other end, and starting from the periphery, a fraction containing heavy impurities is collected, then cleared fluid, then possibly a fraction containing impurities lighter than the fluid, it being provided to recycle at least one fraction of the fluid leaving the apparatus by tangential injection into the first end thereof, the fraction to be recycled independently of the initial fluid to be treated is injected at a point located at a radial distance different from that of the point of injection of said fluid, so as to create in the apparatus at least one second, substantially cylindrical layer concentric to the first, in contact therewith and rotating in the same direction substantially according to the same law of variation of the linear speed as a function of the radius.

11 Claims, 5 Drawing Figures

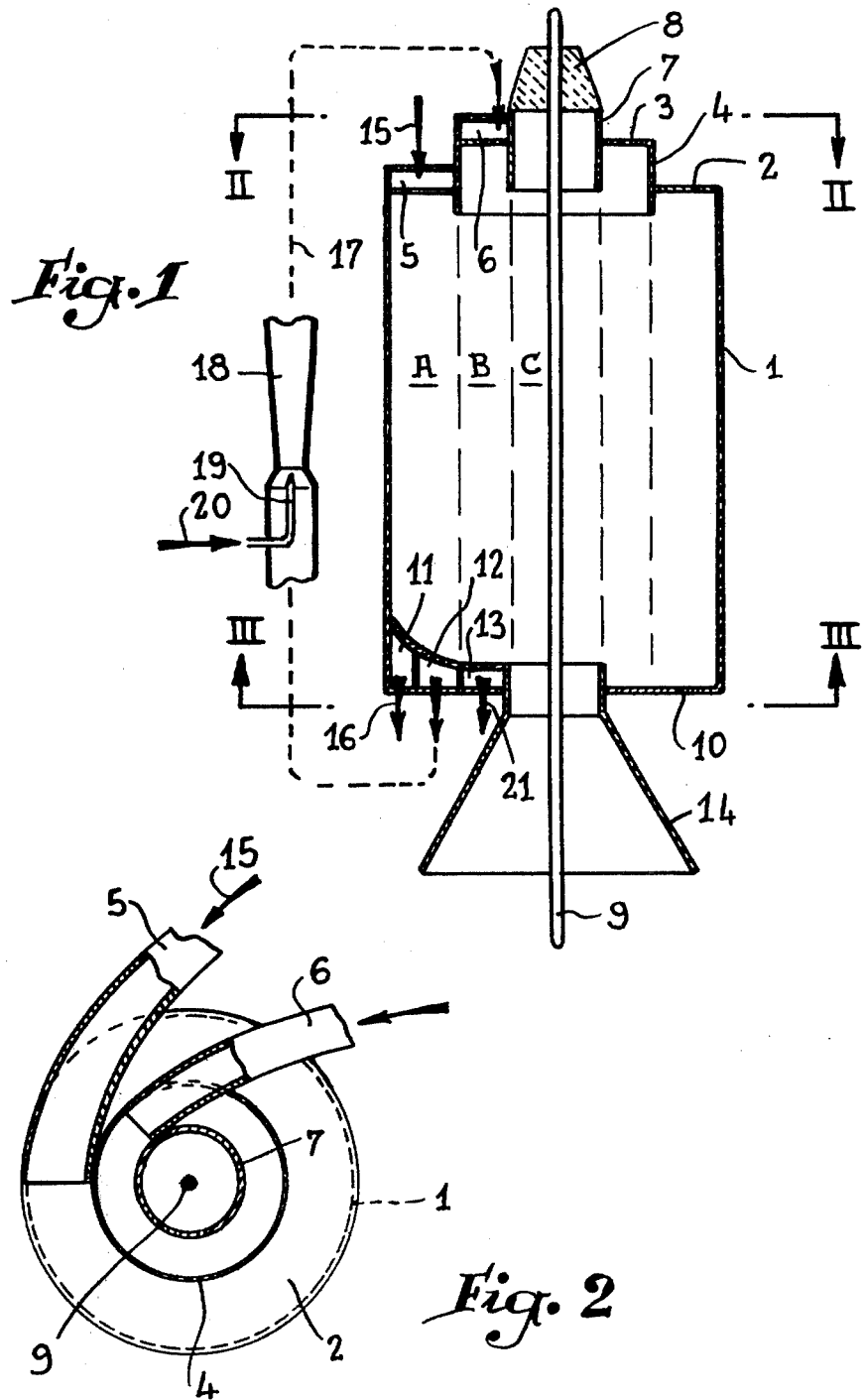

METHODS AND APPARATUS FOR CENTRIFUGAL TREATMENT OF FLUIDS CONTAINING IMPURITIES IN SUSPENSION

The present invention relates to apparatus in which a fluid containing impurities in suspension which are more dense and/or possibly lighter than said fluid is rotated at high speed, with a view to effecting separation thereof.

The fluid injected tangentially in such an apparatus is known to have a tendency to rotate therein according to the so-called irrotational regime, this being advantageous for the separation of the impurities. However, the friction against the wall tends to hinder the stable establishment of this regime.

It is an object of the invention to remedy this drawback.

In accordance with the invention, the fluid leaving the apparatus is recycled one or more times by injecting it tangentially at different distances from the axis so as to produce several concentric cylindrical layers rotating in the same direction substantially according to the same law of variation of the linear speed as a function of the radius.

The invention also relates to an apparatus for carrying out the above process.

The invention will be more readily understood on reading the following description with reference to the accompanying drawings, in which:

FIG. 1 is a longitudinal section through an apparatus according to the invention with two successive rotating layers.

FIGS. 2 and 3 are transverse sections thereof along II—II and III—III (FIG. 1).

Figure 3:
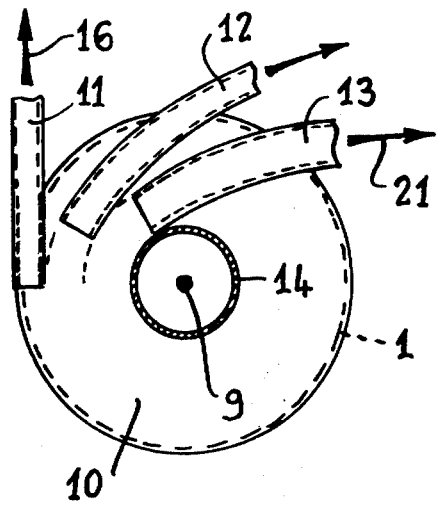

To simplify explanations, it will be assumed hereinafter that the fluid treated is a liquid.

The apparatus shown in FIG. 1 comprises a vertical cylindrical body 1. This body is partly closed at its upper end by a plate composed of two concentric annular portions 2 and 3, the outer portion 2 being located at a level lower than that of the inner portion 3 and these two portions being connected by a vertical sleeve 4. The outer portion 2 is pierced with an opening forming inlet of a flat tangential nozzle 5, which is slightly inclined downwardly and of which the flat section extends over the whole radial width of this portion. Similarly, a like nozzle 6 is associated with the inner portion 3. It will be noted that, to render the drawing more clear, the nozzles 5 and 6 have been shown in section in the same plane whilst for constructive reasons they are advantageously offset somewhat angularly about the vertical axis of the body 1, as shown in FIG. 2.

The connecting sleeve 4 extends downwardly below portion 2. On the other hand a second sleeve 7 is provided which defines portion 3 internally and which also penetrates downwardly, but less than the first sleeve 4. The upper end of the second sleeve 7 receives an insulator 8 which supports an axial electrode 9, which extends downwardly through the whole of the body 1 and extends beyond the bottom thereof.

The lower end of the body 1 is partially closed by an annular plate 10. Three tangential outlets 11, 12 and 13, slightly inclined downwardly, open in this plate and, there again, they have been shown in section in the same radial plane in FIG. 1, whilst in fact they are offset angularly, as shown in FIG. 3. The outermost outlet 11 is of reduced radial width. It is followed by the outlet 12 which is wider, and these two outlets 11 and 12 together correspond in a transverse plane to a radial zone identical to that to which the portion 2 of the upper plate corresponds, i.e. the nozzle 5; in other words, the total width of 11 and of 12 is essentially equal to the distance separating the sleeve 4 from the peripheral wall of the body 1. As to the third outlet 13, the radial zone which it concerns is substantially the same as that to which nozzle 6 corresponds, i.e. the zone defined in a transverse plane by the two sleeves 4 and 7.

In the central opening of the lower plate 10 there is mounted a downwardly oriented divergent pipe 14, the inner diameter of this pipe corresponding substantially to the inner diameter of sleeve 7. As is clearly shown in FIG. 1, the electrode 9 extends beyond the pipe 14.

The nozzle 5 is the one supplying the apparatus, as indicated by arrow 15. It is connected to a suitable device (not shown) which sends it the suspension to be treated under pressure. The outlet 11 corresponds to the separated slurry (arrow 16, FIG. 3). It is connected to a corresponding draining receptacle via a valve or the like enabling the rate of flow to be regulated as a function of the rate of flow of the heavy particles separated with a view to reducing the quantity of liquid which accompany them. The outlet 12 is connected to nozzle 6 by an outer pipe represented schematically as 17 and in which is inserted a Venturi 18 comprising at its throat an injector 19 supplied under a relatively high pressure with an auxiliary fluid (arrow 20) which will be assumed to be air, to give a specific idea. As to outlet 13, it is connected to a suitable pipe (not shown) adapted to collect the treated liquid.

Operation is as follows: the liquid to be treated is injected into the apparatus through nozzle 5. It constitutes inside said apparatus a cylindrical layer A which tends to rotate in irrotational regime with formation of a theoretically hyperbolic axial vortex but which, if the speed of injection is sufficiently high, may be assimilated to a cylindrical surface. Under the effect of the centrifugal force, the heavy impurities are progressively concentrated towards the periphery. The rotating mass is furthermore animated by a descending movement so that more or less concentrated slurry is obtained at outlet 11 and relatively clear liquid at outlet 12. The slurry is drained, whilst the relatively clear liquid flows through pipe 17 and arrives at the Venturi 18, which, under the effect of the injector 19, acts as a pump to give it a higher dynamic and/or static pressure. It thus arrives at nozzle 6 which injects it again tangentially into the body 1 inside which it constitutes a second cylindrical layer B which also tends to follow the irrotational regime. This layer is located inside layer A and if the power of the Venturi injector 18 as well as the form of the nozzle 6 are suitably regulated, its law of movement is substantially the same as that of said layer A, so that, at the boundary of the two layers, the linear speeds are substantially equal and no eddy is therefore formed.

It will be recalled on this subject that the irrotational movement is defined by formula $vr=k$ in which v is the speed at any point, r the radial distance of this point with respect to the axis and k a constant. For the two layers A and B to rotate in harmony, it suffices that the constant k be the same in both cases. The sleeve 4 separates the two layers when they begin to rotate in order to give them time to take the irrotational regime regularly. The sleeve 7 acts in the same way to allow the regular formation of the central vortex, referenced C, at the centre of which the electrode 9 is insulated.

Within the layer B the centrifugal field is more intense than in layer A, with the result that residual heavy impurities are further separated and rejected into layer A to be evacuated through outlet 11. The clear liquid is collected from outlet 13.

The latter may be regulated so that a small quantity of clear liquid overflows through pipe 14, taking along possible light impurities such as floating particles and scum. If the auxiliary fluid injected at 19 is air, fine bubbles rejected inwardly and which thus tend to promote the separation of these light impurities by flotation, appear in layer B.

The electrode 9 serves in known manner to promote the agglomeration of the particles and separation thereof.

When the liquid does not contain light impurities and when it is desired to use it for atomisation (for example in a dust-removal chamber), the outlet 13 may be eliminated or obturated. The clear liquid then escapes totally through the central pipe 14 and is divided into fine droplets, on leaving same, due to its energy of rotation.

Figure 4:
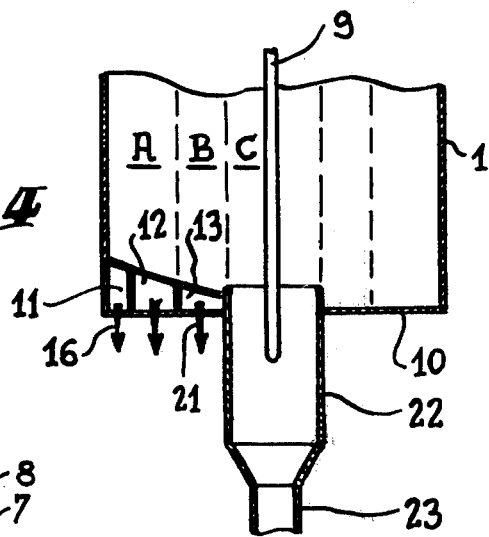
FIG. 4 shows a partial vertical section of a variant embodiment of the lower part.

FIG. 4 shows a variant which may be used when it is desired to collect the light impurities without any effect of atomisation. Here, the pipe 14 is replaced by a simple axial pipe comprising a first portion 22 with large diameter in which the electrode 9 extends, followed by another portion 23 of smaller diameter where the energy of rotation is dissipated.

Figure 5:
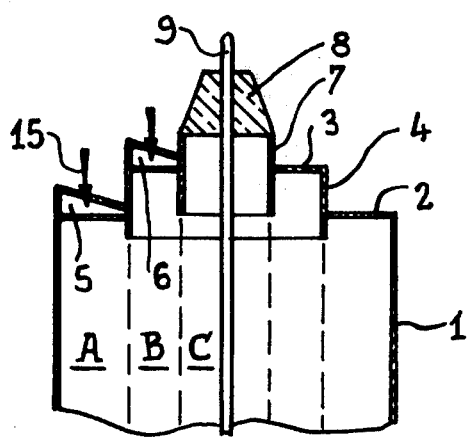
FIG. 5 is a partial vertical section showing a possible structure of the section of the tangential inlet nozzles.

FIG. 5 indicates how the inlet nozzles 5 and 6 may be sectioned with a view to promoting the establishment of the irrotational regime.

As is shown, their section takes the form of a recumbent rectangular trapezium so that the height of this section reduces on approaching the axis, the upper side of the trapezium being able to be concave in order better to correspond to the conditions imposed by the irrotational regime.

To the same end, the walls of the portions 2 and 3 of the upper plate may be provided to be helical, so that they are adapted to the helical movement of the liquid streams, the opening of each of the nozzles then being in a radial plane. In the case of nozzles sectioned as in FIG. 5, the stream constituted by the helical wall must be deformed progressively to be connected to the section of the nozzle.

It is further possible to reduce the formation of eddies towards the nozzles by multiplying the latter for each portion 2 or 3 of the plate. Four nozzles 5 may thus be provided, disposed at 90° with respect to one another on the portion 2 of the plate and four nozzles 6 oriented at 45° with respect to the preceding ones on portion 3. The turbulence is then distributed and absorbed better.

The preceding Figures have shown an apparatus in which two concentric layers A and B rotate, but it is understood that the number of such layers may be greater than two.

It has been assumed hereinbefore that the fluid treated was a liquid, but the invention is also applicable to gases. In such a case there is no longer formation of a vortex such as C and if there are no light impurities, the lower plate may be hermetically closed, the electrode 9 stopping thereabove. The outlet 13 may then be central, if desired.

What is claimed is:

1. In a process for the centrifugal treatment of liquid or gaseous fluids containing impurities in suspension, of the type in which the fluid to be treated is injected tangentially in a first end of an apparatus of circular transverse section in which this fluid forms a first, substantially cylindrical rotating layer, whilst at the other end, and starting from the periphery, a fraction containing heavy impurities is collected, then clearer fluid, then possibly a fraction containing impurities lighter than the fluid, it being provided to recycle at least one fraction of the fluid leaving the apparatus by tangential injection into the first end thereof, the fraction to be recycled independently of the initial fluid to be treated is injected at a point located at a radial distance different from that of the point of injection of said fluid, so as to create in the apparatus at least one second, substantially cylindrical layer concentric to the first, in contact therewith and rotating in the same direction substantially according to the same law of variation of the linear speed as a function of the radius.

2. The process of claim 1, in which the fluid to be treated is injected tangentially in a first zone adjacent the periphery of the apparatus, so that a rotating layer is formed against this periphery, whilst there is collected towards the second end, in the radial zone concerned by this rotating layer, on the one hand a fraction of fluid containing heavy impurities, on the other hand a clearer fraction which is at least partly recycled, wherein this clearer fraction is re-injected immediately inside the first rotating layer formed by the fluid to be treated and there is collected at the second end of the apparatus and in the radial zone concerned by the second rotating layer thus created, on the one hand the treated fluid, on the other hand fluid containing possible light impurities.

3. The process of claim 2, wherein, between the first and the second layer, there is created an intermediate layer of circulation in closed circuit, the inlet of which is connected in parallel to that of the second layer and the outlet of which is for its part connected in parallel to that of the first layer.

4. An apparatus for the centrifugal treatment of a fluid, comprising at a first end a plurality of tangential inlets disposed concentrically with respect to one another and at its second end a plurality of outlets for clearer fluid, as well as re-injection means, the whole being arranged to carry out the process of claim 1.

5. The apparatus of claim 4, wherein the re-injection means comprise a Venturi with injector supplied with a fluid under pressure so as to form pump or ventilator in known manner, this Venturi being inserted between the outlet of one layer and the inlet of the following.

6. The apparatus of claim 4, of the type in which each tangential inlet is formed by a nozzle extending over a noteworthy radial distance, wherein the section of each nozzle is in the form of a recumbent rectangular trapezium with its small base oriented towards the axis of the apparatus.

7. The apparatus of claim 6, wherein the oblique side of the trapezium section of each nozzle is concave in form.

8. The apparatus of claim 4, wherein its first end comprises sleeves which penetrate therein over a certain distance to separate the successive cylindrical layers in the initial zone where their regime of rotation has not yet been regularly established.

9. The apparatus of claim 4, comprising at its large end, apart from the respective outlets for heavy impurities, clearer fluid to be recycled and finally treated fluid, a central outlet intended for the light impurities.

10. The apparatus of claim 4, of the type comprising an axial electrode, wherein said electrode extends at the second end beyond the body of the apparatus through a central pipe provided at this end.

11. An installation for the centrifugal treatment of fluids containing impurities in suspension, comprising, mounted in parallel on the same supply and evacuation circuits, a plurality of apparatus as defined in claim 4, wherein all these apparatus have a common recycling pipe with a single delivery means inserted therein.

* * * * *